(12) United States Patent
Hailesilassie

(10) Patent No.: US 12,130,168 B2
(45) Date of Patent: Oct. 29, 2024

(54) CALIBRATION OF AND SITE SELECTION FOR A WIM SENSOR AND WIM SENSOR

(71) Applicant: KISTLER HOLDING AG, Winterthur (CH)

(72) Inventor: Biruk Hailesilassie, Urdorf (CH)

(73) Assignee: Kistler Holding AG, Winterthur (CH)

( * ) Notice: Subject to any disclaimer, the term of this patent is extended or adjusted under 35 U.S.C. 154(b) by 469 days.

(21) Appl. No.: 17/436,812

(22) PCT Filed: Feb. 5, 2020

(86) PCT No.: PCT/EP2020/052853
§ 371 (c)(1),
(2) Date: Sep. 7, 2021

(87) PCT Pub. No.: WO2020/182376
PCT Pub. Date: Sep. 17, 2020

(65) Prior Publication Data
US 2022/0170778 A1    Jun. 2, 2022

(30) Foreign Application Priority Data
Mar. 8, 2019 (EP) .................................. 19161646

(51) Int. Cl.
*G01G 19/02* (2006.01)
*G01G 23/01* (2006.01)

(52) U.S. Cl.
CPC ........... *G01G 19/024* (2013.01); *G01G 23/01* (2013.01)

(58) Field of Classification Search
CPC ..... G01G 19/022; G01G 19/024; G01G 23/01
See application file for complete search history.

(56) References Cited

U.S. PATENT DOCUMENTS

| | | | |
|---|---|---|---|
| 2009/0048790 A1* | 2/2009 | Geraghty | G01G 23/3728 177/136 |
| 2009/0151421 A1* | 6/2009 | Susor | G01G 23/3735 73/1.13 |
| 2010/0228422 A1* | 9/2010 | Gartner | B60G 17/018 701/31.4 |

(Continued)

FOREIGN PATENT DOCUMENTS

| | | |
|---|---|---|
| DE | 102016225351 A1 | 6/2018 |
| EP | 0 491 655 B1 | 6/1992 |

(Continued)

OTHER PUBLICATIONS

PCT Search Report and Written Opinion, Apr. 21, 2020, 14 pages.
The foreign Office Action in CN with English translation for application No. 202080019025.X, May 25, 2023, 21 pages.

*Primary Examiner* — Natalie Huls
(74) *Attorney, Agent, or Firm* — Dority & Manning, P.A.

(57) ABSTRACT

A method for generating a calibration function of a WIM sensor that is arranged in a roadway and measures a wheel force exerted on the surface of the roadway includes recording the roadway's road profile. A wheel force is determined by a simulation. The simulation is used to determine the dependency of the wheel force on the road profile for at least one position of the road profile that has been recorded in the first step. The dependency is used to minimize the influence of the road profile on the measured wheel force of the WIM sensor.

11 Claims, 3 Drawing Sheets

(56) References Cited

U.S. PATENT DOCUMENTS

| | | | |
|---|---|---|---|
| 2013/0024152 A1* | 1/2013 | Hofmann | G01G 19/022 |
| | | | 702/101 |
| 2017/0314918 A1* | 11/2017 | Shah | E01C 23/07 |
| 2017/0350698 A1 | 12/2017 | Shah et al. | |
| 2018/0245970 A1* | 8/2018 | Wuhrmann | G01G 23/01 |
| 2022/0026262 A1* | 1/2022 | Hailesilassie | G01L 17/00 |

FOREIGN PATENT DOCUMENTS

| | | | | |
|---|---|---|---|---|
| FR | 3030373 A1 | * | 6/2016 | B60C 23/0477 |
| PL | 193210 B1 | * | 1/2007 | G01B 5/28 |
| WO | WO 2009/109158 A1 | | 9/2009 | |
| WO | WO 2011/120176 A1 | | 10/2011 | |
| WO | WO 2013/043701 A1 | | 3/2013 | |

* cited by examiner

CALIBRATION OF AND SITE SELECTION FOR A WIM SENSOR AND WIM SENSOR

CROSS-REFERENCE TO RELATED APPLICATIONS

The present application claims priority to International Application Serial No. PCT/EP2020/052853, which is hereby incorporated herein in its entirety by this reference for all purposes.

TECHNICAL FIELD

The invention relates to a method to improve the measurement accuracy of a Weigh in Motion (WIM) sensor. The invention also relates to a WIM sensor with an improved measuring accuracy arranged in a roadway.

BACKGROUND ART

WIM sensors measure forces that a vehicle exerts on a surface of a section of a roadway by the wheels of the vehicle while driving on the section of the roadway. For the sake of simplicity, section of the roadway will be referred to just as roadway. Such WIM sensors are often used in a WIM system in combination with other sensors for vehicle identification, speed measurement or measurement of environmental factors. A WIM sensor is arranged in the roadway in such a way that at least one wheel of a vehicle moves across the WIM sensor.

WIM systems with at least one WIM sensor are often used to measure a wheel force or an axle force or the total weight of a vehicle. The wheel force corresponds mainly to a proportion of the total weight of a vehicle that exerts on the roadway surface by the wheel. The axle force is the sum of all wheel forces of the wheels of an axle. The total weight is the sum of all axle forces of all axles of the vehicle. If a force exerts on a WIM sensor arranged in the roadway, the force is provided in form of a force signal.

An excessively high wheel force, for example when an overloaded vehicle is driving on a roadway, has a strong effect on the roadway and can lead to greater wear or even damage to the roadway.

Applications such as the direct enforcement of an overloaded vehicle or a toll payment dependent on the wheel force, axle force or total weight place high demands on the accuracy of a WIM system and the force measurement of the WIM sensor.

A WIM sensor is known from EP0491655B1. The WIM sensor is designed as a hollow-profile, with several force measuring elements spaced at a distance from each other within the profile. The force measuring elements provide a force signal. The calibration of the WIM sensor is done by driving a vehicle with a known weight over the WIM sensor. The weight of the vehicle can be determined beforehand on a static weighing station, where the vehicle is weighted while stationary. A disadvantage of a static weighing station is that dynamic effects that have an influence on the force exerted by a wheel on the roadway are not taken into account. The term "dynamic" refers to a "time dependent change". A dynamic effect is, for example, a swinging of the body mass, which is connected to the wheel via a wheel suspension. The body mass is the mass of the body of a vehicle. The body of the vehicle comprises all parts of the vehicle excluding wheels and wheel suspension. For example the engine, the chassis, one or more persons if applicable, and freight if applicable, are part of the body mass.

A swinging of the body mass can be caused by a previous unevenness in the roadway surface. A swinging is a temporal change of a distance, for example the distance of the body to the roadway. For each temporal position, the acceleration of the body mass can be determined. An acceleration of the body mass causes a change of the wheel force a wheel of the vehicle is exerting to the roadway. Another example for a dynamic effect is an acceleration or deceleration of the vehicle, causing an acceleration of the body mass as well. Due to dynamic effects, a force acting on the roadway surface though the wheel may not only be caused by the proportion of the total weight of the vehicle but also by the acceleration of a moving body mass.

Providing a signal refers to the signal being available for further use. Providing a signal also includes storing the signal in an electronic memory and loading the signal from said memory. Providing a signal also includes displaying the signal on a display unit.

Dynamic effects are considered in WO2011120176A1, which corresponds to US Patent Application Publication No. 2013-0024152 that is hereby incorporated herein in its entirety by this reference for all purposes, disclosing a WIM sensor which is calibrated by a calibration vehicle passing over the WIM sensor. The calibration vehicle is equipped with at least one measuring wheel, a so-called wheel force dynamometer, which directly determines the dynamic wheel force, which the wheel exerts on the roadway surface, when passing over the WIM sensor. A calibration function is determined by comparing the wheel force measured by the calibration vehicle with the force measured by the WIM sensor for that wheel. Dynamic effects of vehicles passing the calibrated WIM sensor after calibration procedure is concluded cannot be eliminated by using the calibration function.

Dynamic effects are caused by unevenness in the roadway surface. The term unevenness refers to all elevations and depressions within a surface of the roadway that deviate more than 0.01 mm from a plane defining the average surface of the roadway.

The average surface defines two directions being parallel to this surface: the longitudinal direction and the lateral direction. The longitudinal direction is the direction vehicles are moving on a roadway. The lateral direction is perpendicular to the longitudinal direction. The lateral direction defines a lateral axis being parallel to the lateral direction. The longitudinal direction defines a longitudinal axis being parallel to the longitudinal direction. A position on the roadway is defined by its coordinate on the lateral axis and its coordinate on its longitudinal axis.

A third direction is given by the vertical direction. The vertical direction is perpendicular to the lateral direction. The vertical direction is perpendicular to the longitudinal direction. The vertical direction defines a vertical axis being parallel to the vertical direction. The height, defined by a coordinate on the vertical axis is a measure for a deviation of an unevenness from the average surface at a certain position. A height of zero defines a position on the average surface of the roadway.

The average surface is the surface for which the root mean square deviation considering all positions on the roadway for which a height of an unevenness is available is minimal.

A three-dimensional representation of the surface of a roadway consists of at least three positions on the roadway defined by a lateral coordinate and a longitudinal coordinate having a height. Such a three-dimensional representation of the surface of a roadway is referred to as "road profile" and can be determined with high precision, for example with a roadway surveying vehicle as disclosed in US2017-0350698A1, which is hereby incorporated herein in its entirety by this reference for all purposes.

For all positions on a surface of a roadway, a height can be recorded. If a road profile does not contain a recorded height for a certain position, a height for this position is determined using an interpolation of the heights of the closest positions for which the heights are available.

To increase the accuracy of a WIM sensor arranged in a roadway, the force measuring elements of the WIM sensor are calibrated at predetermined intervals, often in accordance with regulations of the jurisdictional district. These calibrations are expensive and time consuming.

OBJECTS AND SUMMARY OF THE INVENTION

The task of the invention is to increase the measuring accuracy of a WIM sensor.

At least one of the tasks is solved by the features described below.

The invention relates to a method for generating a calibration function of a WIM sensor; which WIM sensor is arranged in a roadway; which WIM sensor measures a wheel force exerted on the surface of the roadway; wherein the following steps are performed:
a) The road profile of a roadway is recorded, the road profile of the roadway being a three dimensional representation of the surface of the roadway;
b) The wheel force is determined by a simulation, which wheel force is exerted on the surface of the roadway by a wheel; which wheel is moving with a speed across the road profile of step a) in a longitudinal direction; which wheel is pressed onto the surface of the roadway;
c) The dependency of the wheel force determined in step b) on the road profile determined in step a) is determined by simulation for at least one position of the road profile recorded in step a);
d) The dependency of the position determined in step c) is used to minimize the influence of the road profile on the wheel force measured by the WIM sensor.

Minimizing the dependence of the wheel force measured by the WIM sensor from the road profile increases the measuring accuracy of the WIM sensor.

A vehicle comprises at least two wheels, which wheels are connected to a body mass by means of a wheel suspension. The body mass comprises the combined masses of all parts of the vehicle excluding wheels and wheel suspension. For example the masses of the engine, the chassis, one or more persons if applicable, and freight if applicable, are part of the body mass. The suspension comprises a spring element and a damping element. The suspension minimizes the influence of an unevenness of the surface of a roadway on the movement of the body mass. For example the suspension minimizes a swinging of the body mass upon a wheel connected to the body mass encounters an unevenness while driving on the surface of the roadway. The wheel comprises a running surface which is in contact with the surface of the roadway. Furthermore, the wheel comprises a wheel hub, the wheel hub being the centre of rotation of the wheel while driving across the surface of the roadway and the wheel hub being connected to the wheel suspension. The running surface is part of a usually elastic element of the wheel, for example a gas-filled element in case the wheel is a gas-filled tire, or a rubber element in case the wheel is a full-cushion tire. The wheel therefore shows a spring like behaviour and a damping behaviour.

Despite suspension of the wheel, the body mass shows a swinging when the wheel is driving across an uneven surface. The swinging of the body mass influences the force pressing the wheel onto the surface of the roadway. If the body mass is swinging while driving across a WIM sensor being arranged in the roadway, the wheel force or axle force is not determined correctly by the WIM sensor. The wheel force shows a dynamic behaviour over time. This dynamic behaviour which can be translated into a position dependent wheel force for each a position on the roadway, if the speed of the vehicle is known. The wheel force of a vehicle influenced by the swinging of the body is denominated dynamic wheel force.

The method according to the invention is used to simulate the dynamic wheel force of a vehicle and to use this simulation to improve the accuracy of a WIM sensor.

The simulation is preferably based on a so-called quarter car model, which is simulating one wheel of a vehicle on a surface with a corresponding partial body mass. The partial body mass is the mass pressing the wheel against the surface of the roadway. The partial body mass is for convenience's sake denominated body mass. Of course, also the so-called half-car model can be used, where one side of the car, i.e. one wheel per axle is simulated. The simulation may also be based on a so-called full track model, also known as full car model, where the whole vehicle is simulated. While the last two mentioned models promise a slightly more realistic model as movement of one wheel also influences the other wheels of the simulation, the increase in computing power is immense. For the application described hereafter, although the models may be used, the so-called quarter car model is deemed sufficient. Therefore, in the following the description is given for the quarter car model. However, it is clear that a person known in the art may use the half car model or the full car model instead.

The body mass and the mass of the wheel are connected by a first spring and a first damping element, first damping element and first spring being arranged in parallel between the body mass and the mass of the wheel. The position of the surface the wheel is pressed onto is connected to the mass of the wheel by a second spring and a second damping element, second damping element and second spring being arranged in parallel between the mass of the wheel and the position on the surface the wheel is pressed against. When resting, the first spring and the second spring are both in a state of static preloaded equilibrium.

The wheel in motion will encounter the unevenness of the surface of the roadway, resulting in a change of the distance of the mass of the wheel and the position on the surface the wheel is pressed against. This change of distance changes the loading of the second spring. The movement of the surface is thus exciting a movement of the wheel mass depending on the spring constant and the damping constant of the second spring and second damping element. Movement of the wheel mass is not free, as the wheel mass is connected to the body mass by the first spring and first damping element. Movement of the wheel mass changes the distance of the wheel mass to the body mass. This change of distance changes the loading of the second spring. The change of the between wheel mass and body mass is thus exciting a movement of the body mass depending on the spring constant and the damping constant of the first spring and first damping element. In fact, a change of the position on the surface the wheel is pressed against thus results in a complex movement of body mass and wheel mass coupled by a damped two spring system. The movement of body mass and wheel mass coupled by a damped two spring system can be described by system of differential equations solving the equation of movement of the wheel mass and the body mass. The movement of the wheel mass and body mass determines the force pressing the wheel onto the surface of the roadway.

Thus, the dynamic wheel force can be determined with knowledge of the unevenness of the roadway in the wheel track. The wheel track is the section of the roadway the wheel is covering during its movement across the surface of the roadway.

Preferably the simulation is performed for different speeds, wheel masses, body masses, first spring constants, first damping constants, second spring constants, second damping constants, one combination of which defining a unique quarter car travelling with a unique speed on the surface of the roadway. The dynamic wheel force and its deviation from the static wheel force is determined for each position of the wheel track on the surface of the roadway. The static wheel force is the force a wheel of a resting vehicle is exerting onto the surface of the roadway.

With the result of the simulation it is possible to identify locations best suited for installation of a WIM sensor, by evaluating which position on the roadway shows the least deviation for a predetermined quarter-car. It has been seen in recent tests that spring and damping constants of vehicles are usually within a small range for vehicles of a certain range of body mass. For a predetermined parameter, like the desired travelling speed and/or one or more body mass of vehicles, the best location can be chosen that shows the least deviation of the dynamic weight from the static weight. Usually, this location should extend in a longitudinal direction for a distance of at least 1 m. More, a locations best suited for installation of a WIM sensor can be chosen as a best compromise when considering multiple parameters, like different speeds of vehicles, the location showing the least deviation of the dynamic weight from the static weight for all parameters considered. This is important for example, if the WIM installation is arranged in a zone where a variable-message sign changes the speed limit of the section of the roadway with respect to weather conditions, time or traffic conditions. The selection of parameters for speed and weight can be done with respect to the desired criteria for vehicle mass measurement. A WIM sensor arranged in a location selected by the method described above shows a higher accuracy than a similar WIM sensor arranged at a random position in the roadway. Thus the method improves the accuracy of the WIM sensor.

Furthermore, the simulation determines a calibration function for a WIM sensor. An evaluation element for the WIM sensor evaluates at least one force signal determined and provided by the measuring element of the WIM sensor. The evaluation element applies the calibration function to the force signal and provides the result as a calibrated force signal. The calibrated force signal shows a smaller deviation from the static wheel force than a wheel force measured without use of the calibration function, which calibration function is determined by the simulation described above. Thus the method improves the accuracy of the WIM sensor measuring the wheel force.

BRIEF DESCRIPTION OF THE DRAWINGS

The drawings used to explain the embodiments show.

DETAILED DESCRIPTIONS OF PRESENTLY PREFERRED EXEMPLARY EMBODIMENTS

Figure 1:
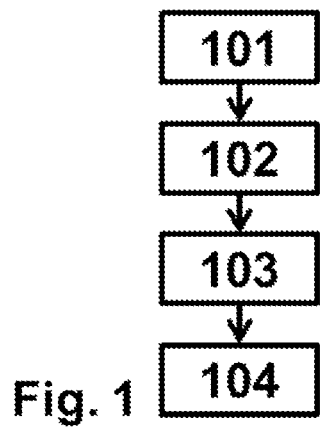
FIG. 1 A schematic illustration of the method for improving the precision of a WIM sensor, FIG. 2 A representation of a sectional view of a vehicle on a roadway, FIG. 3 A representation of a sectional view of a wheel of a vehicle on a roadway, FIG. 4 A schematic representation of a mass-spring model representing a vehicle on a roadway, FIG. 5 A schematic representation of the mass-spring model representing a vehicle on a roadway of FIG. 4 illustrating the forces involved, FIG. 6 A sketch of a sectional view of a wheel of a vehicle on a roadway, with a WIM sensor arranged in the roadway, and FIG. 7 A sketch of a view taken from above a section of a roadway.

FIG. 1 shows an illustration that is a schematic representation of the method for improving the precision of a WIM sensor arranged in a roadway, comprised of step a) 101, step b) 102, step c) 103 and step d) 104. The steps are described in detail below.

Step a) comprises recording a profile of a roadway 1, the profile of a roadway being a three dimensional representation of the surface 2 of the roadway schematically shown in FIGS. 2-7. The profile of the roadway that is determined according to step a) of the method is stored electronically in an electronic memory, which profile for example can be in the form of a three-dimensional object. An electronic memory can be a random access memory (RAM) and/or a memory, for example an EEPROM (electrically erasable programmable read-only memory). A three-dimensional object can be represented in the form of a 3-dimensional wire frame model known from computer assisted design software. The electronically stored road profile 2 is provided for further use in the simulation of step b) 102.

Step b) 102 comprises determining the wheel force F9 by a simulation 102; which wheel force F9 is exerted on the road profile 2 by a wheel 8; which wheel 8 is moving with a speed across the road profile 2 of step a) in a longitudinal direction X; which wheel 8 is pressed onto the surface of the roadway 1. The simulation is run on a processing element of a computer system. The simulation is generated by a computer program, which defines certain operations that the processing element should perform on an input. The input data for generating the simulation are at least the road profile 2 and a description of the vehicle and vehicle speed. The description of the vehicle includes all data that the simulation needs to calculate a wheel force F9 as an output of the simulation as described below.

Figure 2:
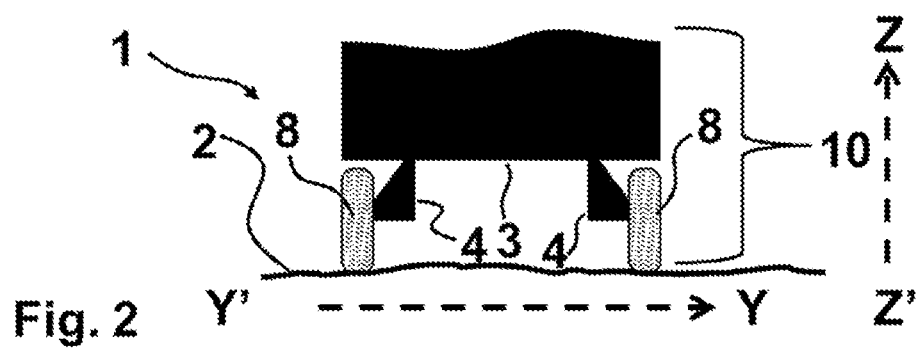

FIG. 2 shows a sketch of a sectional view of a vehicle on a roadway in a plane given by the lateral axis Y'Y and vertical axis Z'Z. The wheels 8 of the vehicle 10 are connected to the body mass 3 of the vehicle 10 by the suspension 4 of the vehicle 10. The vehicle 10 in FIG. 2 is depicted moving on the surface of the roadway 1 in a longitudinal direction X (not shown), which is the direction that is orthogonal to the directions of both the lateral axis Y'Y and the vertical axis Z'Z.

Figure 3:
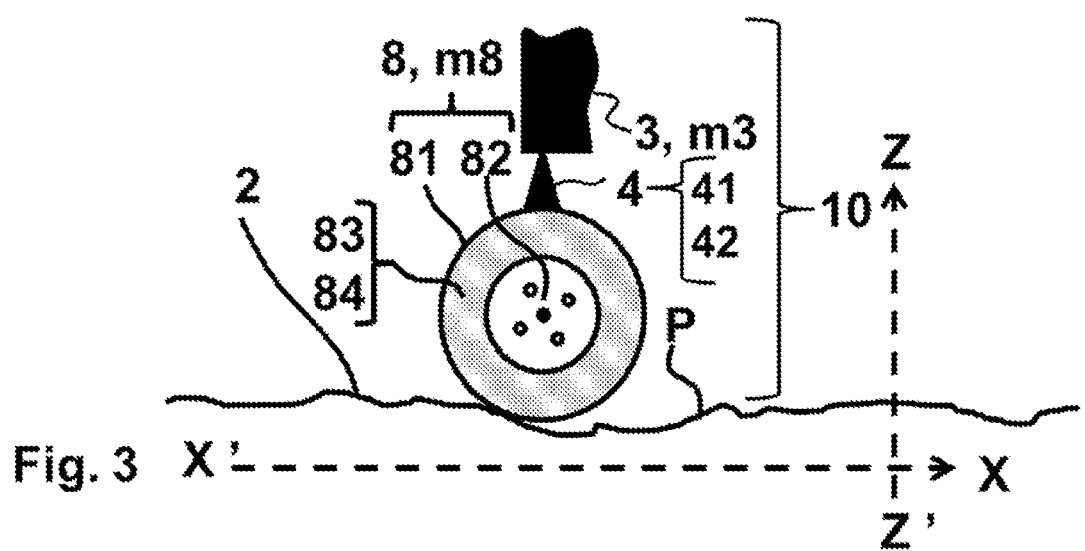

FIG. 3 shows a sectional view of the wheel 8 of a vehicle 10 on a roadway 1 in a plane given by the longitudinal axis Y'Y and the vertical Z'Z axis simulated in one embodiment of the simulation 102. In step b) the wheel 8 is connected to at least one body mass m3 of the body 3 of the vehicle 10. The wheel 8 in step b) 102 is pressed onto the road profile 2 by the body mass m3.

In one embodiment, in step b) the wheel 8 is connected to the body mass m3 via a resilient connection that is characterized with a predefined spring element constant c42, c84 and damper element constant k41, k83, for example a resilient connection, in particular a wheel suspension 4 with a spring element 42 and a damper element 41 or shock absorber 41 of a vehicle 10. In the simulation, the wheel 8 moves across the surface of the roadway 1 in the longitudinal direction X. The wheel 8 comprises a wheel hub 82, which is the centre of rotation of the wheel 8 and the theoretical location of the mass m8 of the wheel 8 in the simulation step 102.

In one embodiment of the simulation 102, in step b) the wheel 8 is characterized by a spring element 84 and a damper element 83, for example an elastic running surface with a predetermined spring element 84 and a predetermined damper element 83. Therefore, the wheel 8 with the spring element 84 and the damper element 83 is a damped mass-spring system 200 in the simulation step 102.

In one embodiment, in step b) the simulation 102 comprises at least one damped mass-spring system 200; the damped mass-spring system 200 comprising at least one spring element 42, 84, at least one damper element 41, 83 and at least one mass m3, m8.

Figure 4:
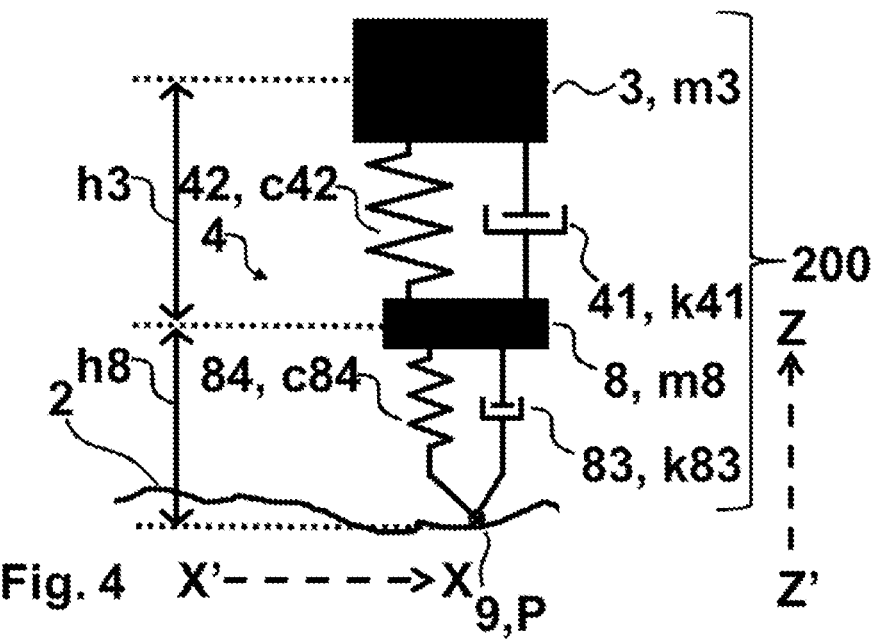
Figure 5:
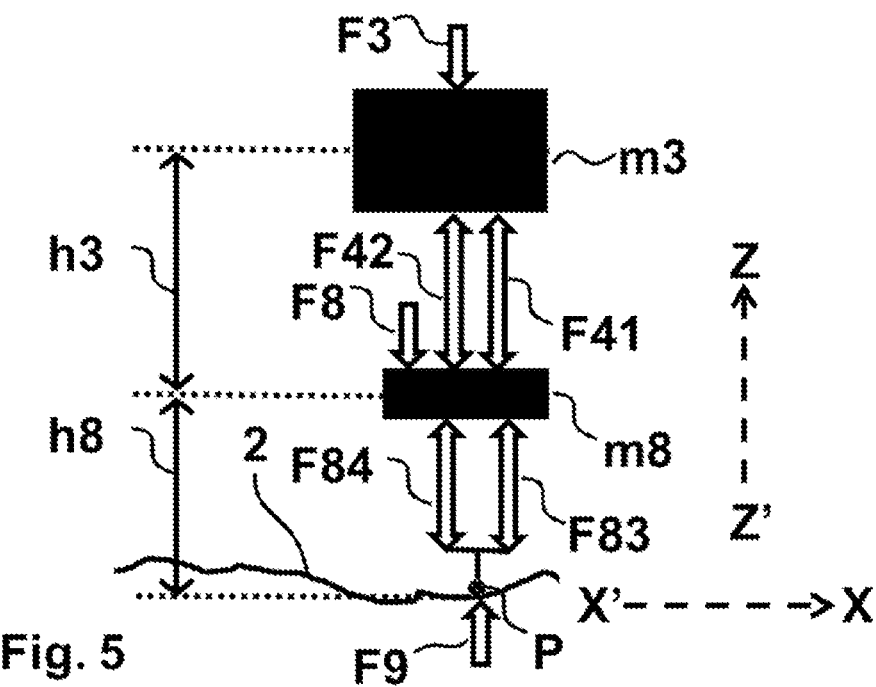
Figure 6:
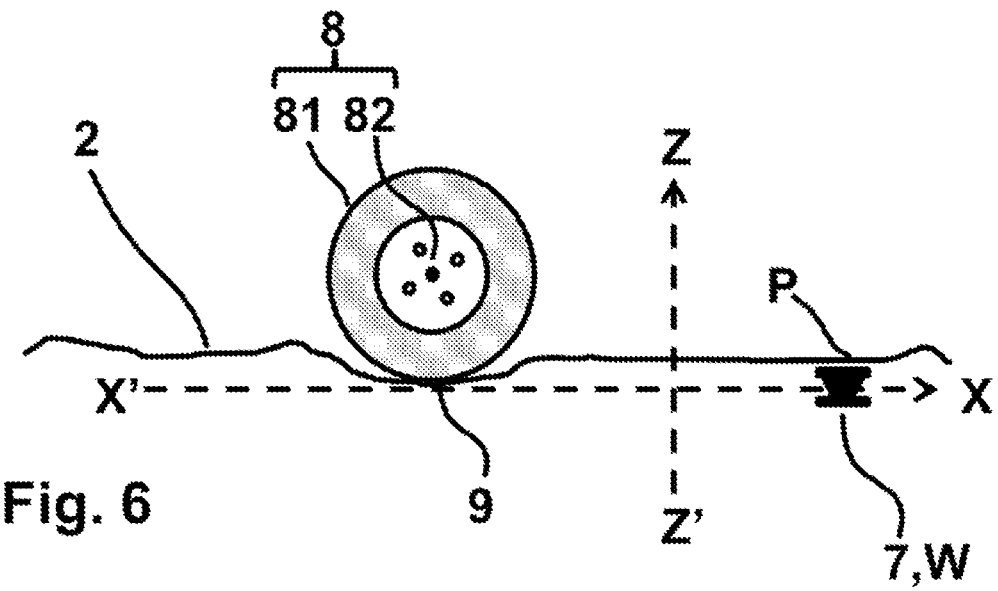
Figure 7:
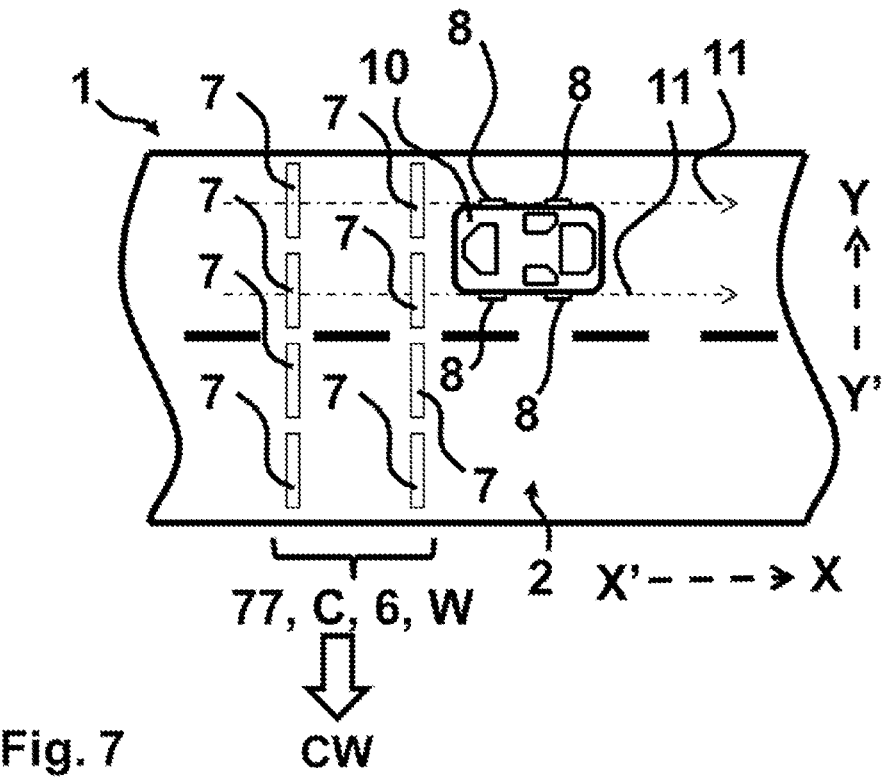

FIG. 4 shows the damped mass-spring system 200 simulated in one embodiment of the step b) simulation 102. The mathematical description of the model of a vehicle 10 on a roadway 1 can be represented in the simulation 102 as a one-dimensional juxtaposition of a first spring 84, a wheel mass 8, a second spring 42 and a body mass m3. Parallel to the first spring 84, a first damper element 83 is arranged. Each spring 42, 84 and damper element 41, 83 can be moved in one dimension, which is parallel to the vertical axis Z'Z.

The simulation 102 carried out in step b) determines the wheel force F9 that a wheel 8 exerts onto a contact point 9 between the wheel 8 and the roadway 1 on the surface of the roadway 1 by the mass m3, m8 connected to the contact point 9 via at least one damper element 41, 83 and at least one spring element 42, 84.

As schematically shown in FIG. 4, the first spring 84 and the first damper element 83 are fixed to the wheel mass m8. The second end of the first spring mass 84 and the first damper element 83 are commonly connected to a theoretical contact point 9. The contact point 9 is in contact with the surface of the roadway 2. The contact point 9 is the point in the middle of a contact surface where the wheel 8 touches the surface of the roadway 2.

Parallel to the second spring 42, a second damper element 41 is arranged as schematically shown in FIG. 4. The second spring 42 and the second damper element 41 are connected to the body mass m3 and connected to the wheel mass m8.

As schematically shown in FIG. 4, mass m3 and wheel mass m8 can move freely in the direction along the vertical axis Z'Z and within the constraints given by the forces that the springs 42, 84 and damper elements 41, 83 exert on the body mass m3 and wheel mass m8.

For a resting vehicle 10, forces acting on the body mass m3 and the wheel mass m8 are in equilibrium. For a moving vehicle 10, the only forces that have to be considered are those which are differing from the equilibrium forces. The forces involved in the simulation 102 of the vehicle 10 moving on the surface of the roadway 1 are shown schematically in FIG. 5.

The forces acting on the body mass m3 are given according to the simulation 102 of step b) by the following differential equations:

$$m3\frac{d^2(h3)}{dt^2} = -F42 - F41 + F3,$$

$$F42 = c42h3,$$

$$F41 = k41\frac{d(h3)}{dt},$$

with d/dt being the first time derivative, $d^2/dt^2$ being the second time derivative, h3 representing the distance between the body mass m3 and the wheel mass m8, F3 is representing a force due to an acceleration or deceleration of the vehicle 10 and/or due to the vehicle 10 driving along curve on the roadway 1, c42 represents the spring constant of the second spring 42, and k41 represents the damping constant of the second damper 41.

The forces acting on the wheel mass m8 are given according to the simulation 102 of step b) by the following differential equations:

$$m8\frac{d^2(h8)}{dt^2} = -F84 - F83 + F42 + F41 + F8,$$

$$F84 = c84h8,$$

$$F83 = k83\frac{d(h8)}{dt},$$

with d/dt being the first time derivative, $d^2/dt^2$ being the second time derivative, h8 representing the distance between wheel mass m8 and contact point 9, F8 is representing a force due to a potential unbalance of the wheel 8 or a non-uniformity of the wheel 8 or suchlike, c84 representing the spring constant of the first spring 84, and k83 representing the damping constant of the second damper 83.

The wheel force F9 acting on the road profile 2 is given according to the simulation 102 of step b) by the following differential equation:

$$F9 = F84 + F83.$$

The simulation 102 determines the movement of the wheel mass m3 and the body mass m8 by introducing an unevenness of the roadway 1 in the road profile 2 as an excitation of the damped spring mass system 200. A movement of the wheel 8 across the road profile 2 is simulated by moving the contact point 9 in a longitudinal direction X. This changes the distance h8. The temporal rate at which the distance h8 changes, depends on the speed of the vehicle 10. Thus, for calculating the wheel force F9 at a given position on the roadway 1, the simulation needs the speed of the vehicle 10 and the road profile 2 of the roadway 1 that the wheel 8 encounters for all positions on the roadway as an input data. As this is not possible in practice, especially since the road profile 2 of the roadway 1 recorded in step a) is limited in a longitudinal direction, the simulation is started with starting conditions of the damped spring systems involved in equilibrium. In order to determine the wheel force F9 at a certain position on the roadway, the starting position of the simulation 102 is chosen to be at least 1 m distance, preferably at least 100 m distance, optimal 500 m distance, from the position the wheel force F9 should be calculated for by the simulation 102.

In a presently preferred embodiment of the invention, the simulation 102 determines the wheel force F9 by establishing and solving a system of differential equations given by the differential equations for the damped mass spring system 200 given above.

In another embodiment of the invention, the simulation 102 determines the wheel force F9 by establishing and solving a system of differential equations given by the differential equations for the mass spring system 200 given above, wherein some terms of the system of differential equations are neglected. A term is neglected if it does not contribute to the resulting wheel force F9 more than 10 percent, preferably less than one percent.

In another embodiment of the invention, the simulation 102 determines the wheel force F9 by establishing and solving a system of differential equations given by the differential equations for the mass spring system 200 given above, wherein the first spring 84 and the second spring 42 are combined in one spring element (not shown), the first damper element 83 and the second damper element 41 are combined into one damper element (not shown) and the wheel mass m8 is neglected and the forces F8 acting on the wheel 8 are neglected. The differential equations and the system of differential equations are adapted respectively. In this embodiment, the calculation is performed faster compared to calculating the first and second damper elements 41, 83 separately.

In another embodiment of the invention, the simulation 102 determines the wheel force F9 by establishing and solving a system of differential equations given by the differential equations for the mass spring system 200 given above, wherein the wheel mass 8 and the contact point 9 are connected with an element of constant length, comprising distance h8 constant. First damper element 83 and the first spring element 84 are omitted. The differential equations and the system of differential equations are adapted respectively.

In another embodiment of the invention, the simulation 102 determines the wheel force F9 by establishing and solving a system of differential equations given by the differential equations for the mass spring system 200 given above, wherein the first damper element 83 and the second damper element 41 are omitted. The differential equations and the system of differential equations are adapted respectively.

In another embodiment of the invention, the simulation 102 determines the wheel force F9 by establishing and solving a system of differential equations given by the differential equations for the mass spring system 200 given above, wherein the first damper element 83 is omitted. The differential equations and the system of differential equations are adapted respectively.

In another embodiment of the invention, the simulation 102 determines the wheel force F9 by establishing and solving a system of differential equations given by the differential equations for the mass spring system 200 given above, wherein the force F8 acting on the wheel mass m8 due to a potential unbalance of the wheel 8 or a non-uniformity of the wheel 8 or suchlike is omitted. The differential equations and the system of differential equations are adapted respectively.

In another embodiment of the invention, the simulation 102 determines the wheel force F9 by establishing and solving a system of differential equations given by the differential equations for the mass spring system 200 given above, wherein the force F3 acting on the body mass m3 due to an acceleration or deceleration of the vehicle 10 and/or due to the vehicle 10 driving along a curve on the roadway 1 is omitted. The differential equations and the system of differential equations are adapted respectively.

In another embodiment of the invention, the force F3 includes forces exerted on the body mass m3 by wheel forces F9 of other wheels 8 of the vehicle 10. A wheel force F9 can be determined with the simulation 102, and each wheel 8 has its own body mass in its simulation. As body masses m3 of each wheel 8 are connected in a real vehicle 10, movement of the body mass m3 of one wheel 8 influences the movement of the other body masses m3 of the other wheels 8 of a vehicle 10. The differential equations and the system of differential equations are adapted to consider the movement of other body masses m3. This simulation 102 thus uses a full car model or a half car model mentioned above.

In the different embodiments described above, the calculation is faster due to the omitting of terms, combination of terms, or rendering terms constant. This way, calculation power can be saved and a more cost-effective computing device for the simulation can be used.

The different embodiments may be combined where possible, and embodiments resulting from such a combination of embodiments described above are part of the invention as well.

In step c) of FIG. 1, the dependence of the wheel force F9 determined by the simulation 102 in step b) on the road profile 2 recorded in step a) is determined by the simulation 102 for at least one position P of the road profile 2 recorded in step a).

The dependency of the position P determined in step c) is used to minimize the influence of the road profile 2 on the wheel force W measured by the WIM sensor 7. This increases the measurement accuracy of the WIM sensor 7, as perturbations of the measurement by the road profile 2 are minimized.

It has been found that in order to obtain realistic results in the simulation 102 of a dynamic wheel force F9, the road profile 2 recorded in step a) 101 is recorded with an accuracy of at least 1 mm, preferred 0.2 mm, along a vertical axis Z'Z of the roadway 1; and the road profile 2 recorded in step a) 101 is recorded with an accuracy of at least 100 mm, preferred 2 mm, along a longitudinal axis X'X of the roadway 1; and the road profile 2 recorded in step a) is recorded with an accuracy of at least 100 mm, preferred 2 mm, along a lateral axis Y'Y of the roadway 1.

In one embodiment, in step b) the simulation 102 determines an excitation of the damped mass-spring system 200, excited by the wheel 8 moving with a speed across an unevenness of the surface of the roadway 1. In terms of the simulation 102, the unevenness is being represented within the road profile 2 of step a). This ensures that results of the simulation 102 are showing the same wheel force F9 as a vehicle 10 that would be travelling on the roadway 1.

In one embodiment, for a position P in step c) the wheel force F9 depends on the spring element 42, 84 defined by a spring constant and damper element 41, 83 defined by a damping constant of the at least one damped mass-spring system 200. The wheel force F9 depends on the speed of the wheel 8 moving across the surface of the roadway 1. The wheel force F9 depends on at least one mass m3, m8 of the mass spring system 200 for a position in step c). The speed of the wheel 8 changes the excitation of the mass spring system 200 and has therefore an influence on the dynamic motion of the excited damped mass spring system 200 as well as the damped mass spring systems dynamic motion is depending on the mass m3, m8 being part of the damped mass spring system 200.

In one embodiment, step c) is performed for a number of adjacent positions P on the longitudinal axis X'X and/or adjacent positions P on the lateral axis Y'Y; wherein an adjacent position has a distance between 2 mm and 500 mm to each other. Furthermore, step c) is performed for at least one damped mass-spring system 200 comprising at least one mass m3, m8 and at least one spring element 42, 84 and at least one damper element 41, 83 and for at least one speed of the wheel 8 on the road profile 2; the speed in combination with the road profile 2 of the roadway 1 determining the excitation of the damped mass-spring system 200.

In one embodiment, the road profile (2) in step a) 101 is determined by a recording vehicle (not shown recording the unevenness of the roadway (1) while driving on the roadway (1) or that the road profile (2) of step a) 101 is recorded by an aircraft (not shown) recording the unevenness of the roadway (1) while flying over or next to the roadway (1).

Minimizing the dependence of the wheel force F9 measurement of the WIM sensor 7 from the road profile 2 is achieved by generation of a calibration function (C) for a WIM sensor 7. For generation of the calibration function (C) the following steps are performed:

d1a) The road profile 2 in step a) is recorded for at least one lane of a section of the roadway 1, starting at a distance in front of the position P the WIM sensor 7 is arranged at with respect to the longitudinal direction X and ending at least 100 mm behind the position P the WIM sensor 7 is arranged at; with the distance being at least 25 m, preferred 100 m, optimal 500 m;

d2a) the wheel force F9 according to step b) is determined by the simulation 102;

d3a) the dependency of the wheel force F9 on the road profile 2 at the positions P the WIM sensor 7 is arranged in the roadway 1 is determined according to step c) 103 for different speeds ranges within an overall speed range between and including 5 km/h and 250 km/h; and step c) 103 is performed for different wheel force ranges within an overall wheel force range between and including 1000 N and 50000 N per wheel 8; and spring elements 42, 84 and damper elements 41, 83 are predetermined for a respective wheel force range;

d4a) the deviation of the wheel force F9 according to d3a) depending on the speed range and mass range and on the road profile 2 from a measured wheel force W of a stationary vehicle 10 with a mass within the mass range is determined; and that the calibration function (C) generated is able to subtract the deviation from the measured wheel force W of the WIM sensor 7 according to the wheel force range and according to the speed range of a speed determined for the wheel 8. FIG. 1 schematically shows a sectional view of a wheel 8 of a vehicle on a roadway 2, with a WIM sensor 7 arranged in the roadway 2.

It was found that the length of the road profile 2 given in step d1a) is enough to obtain realistic results of the wheel force F9 from the simulation 102. With the result of the simulation 102 of Step d4a) a calibration function (C) can be generated which is not only calibrating a measured wheel force W depending on the measured wheel force W but also calibrating the measured wheel force W depending on the speed of the vehicle 10.

Thus, the calibration function (C) calibrates the measured wheel force W. The calibration function (C) is a function of measured wheel force W and speed of the vehicle 10.

The calibration function (C) can be used readily in a WIM System 77. One embodiment of a WIM system 77 is shown as an example in FIG. 7. The WIM system 77 includes an evaluation element 6. The WIM system 77 is adapted to determine the speed of a wheel driving across the WIM sensor 7. The WIM sensor 7 is part of the WIM system 77 and the evaluation element 6 uses the calibration function (C) to subtract the deviation from a measured wheel force of the WIM sensor 7 according to the wheel force range the measured wheel force is within, and according to the speed range the speed determined for the wheel 8 is within; and accordingly the evaluation element 6 provides the result as a calibrated wheel force CW.

The wheel force F9 determined by the WIM sensor 7 of a WIM system 77 is calibrated with the calibration function (C); accordingly the calibrated wheel force CW reduces the influence of the road profile 2 on the measured wheel force W by at least 75% with respect to the measured wheel force W of a stationary vehicle 10.

In one embodiment, the simulation 102 is used to select a location fora WIM sensor 7. This is advantageous, as deviations of a measured wheel force W depending on the road profile 2 can be minimized before the WIM sensor 7 is installed in the roadway 1.

For selection of a location for a WIM sensor 7 to be installed in the roadway 1, the following steps are performed:

a2) The road profile 2 of a section of the roadway 1 is recorded according to step a) for at least one lane of the roadway 1, in which lane the WIM sensor 7 is to be installed; which section of the roadway 1 comprises a length along the longitudinal direction X of at least 25 m, preferred 1000 m, optimal 5000 m;

b2) The wheel force (F9) is determined by a simulation (102) according to step b) (102);

c2) The dependence of the wheel force F9 exerted on the road profile 2 determined in step a) 101 is determined by the simulation 102 for a number of adjacent positions P in the longitudinal direction X, wherein adjacent positions P are separated from each other by a distance between 250 mm and 5000 mm; which positions lie within the road profile (2) recorded in step a) 101;

c3) Step c2) is performed for different speed ranges within an overall speed range between and including 5 km/h and 250 km/h; and step c2) is performed for different wheel force ranges within an overall wheel force range between and including 1000 N and 50000 N per wheel 8; and spring elements (42, 84) and damper elements 41, 83 are predetermined for a respective wheel force range;

d2) From the results of step c3) a position P of the roadway 1 is selected, where the dependence of the wheel force F9 is minimal for at least one preselected wheel force range and at least one preselected speed range.

Of course, the preselected wheel force range must be chosen according to the demands on the wheel force measurement W. Such demands are different for wheel force measurements W at a toll booth versus wheel force measurements W at a mining site or versus wheel force measurements at an airport. The same is true for preselected speed ranges. The selection of the wheel force range and the speed range is therefore at the discretion of the owner of the WIM sensor 7.

In one embodiment, the location of a WIM sensor 7 that is installed in the roadway is selected for all WIM sensors 7 of the WIM System 77. The WIM system 77 comprising at least one WIM sensor 7. When all WIM sensors 7 of a WIM System are in respective positions P where deviations of a measured wheel force W depending on the road profile 2 are minimized, then the overall accuracy of the WIM system 77 is increased.

It is understood that the different aspects and embodiments described above may be combined where possible, and embodiments resulting from such a combination of embodiments described above are part of the invention as well.

LIST OF REFERENCE SYMBOLS

1 roadway
10 vehicle
11 track of wheel
101 step a)
102 step b)/simulation
103 step c)
104 step d)
2 road profile
3 body
4 suspension
41 damper element
42 spring element
6 evaluation element
7 WIM sensor
77 WIM system
8 wheel
81 running surface
82 hub
83 damper element
84 spring element
9 contact point
c42 spring constant
c84 spring constant
CW calibrated wheel force
F9 determined wheel force
h3 distance
h8 distance
k41 damping constant
k83 damping constant
m3 body mass
m8 wheel mass
P position
W measured wheel force
X longitudinal direction
Y lateral direction
Z vertical direction
X'X longitudinal axis
Y'Y lateral axis
Z'Z vertical axis

The invention claimed is:

1. WIM System comprising:
 a WIM sensor arranged in a roadway having a surface defined by a road profile, wherein the WIM sensor is configured for measuring a wheel force exerted on the surface of the roadway;
 a recording vehicle configured for recording unevenness of a roadway on which the recording vehicle is driving;
 an evaluation element that includes a calibration function; wherein the calibration function operates according to a calibration method that includes the following steps:
  a) using the recording vehicle to record the road profile of the roadway, wherein the road profile of the roadway being a three dimensional representation of the surface of the roadway;
  b) using a simulation to determine a wheel force exerted on the road profile by a wheel pressed onto the surface of the roadway according to the simulation, wherein the wheel is moving with a speed across the road profile of step a) in a longitudinal direction according to the simulation, which includes a system of differential equations solved for movement of a wheel's mass and a body mass of a damped mass-spring system having a spring element and a damper element together with the wheel mass and the body mass;
  c) wherein the wheel force is determined in step b) for at least one position of the road profile recorded in step a); and
  d) the dependency of the position determined in step c) is used by the simulation to minimize the influence of the road profile on the wheel force measured by the WIM sensor;
   i. wherein the following sub steps are performed:
   ii. the road profile in step a) is recorded for at least one lane of a section of the roadway, starting at a distance in front of a position a WIM sensor is arranged at with respect to the longitudinal direction and ending at least 100 mm behind the position the WIM sensor is arranged at; with the distance being at least 25 m;
   iii. wherein the wheel force according to step b) is determined by the simulation;
   iv. wherein the dependency of the wheel force on the road profile at the position the WIM sensor is arranged in the roadway is determined by the simulation according to step c) for different speed ranges within an overall speed range between and including 5 km/h and 250 km/h; and step c) is performed by the simulation for different wheel force ranges within an overall wheel force range between and including 1000 N and 50000 N per wheel; and wherein the simulation includes spring elements and damper elements that are predetermined for a respective wheel force range;
   v. wherein the simulation determines a deviation of the wheel force depending on the speed range and mass range and on the road profile from a measured wheel force of a stationary vehicle with a mass within the mass range; and wherein the simulation generates a calibration function by subtracting the deviation from a measured wheel force of the WIM sensor according to the wheel force range and according to the speed range of a speed determined by the simulation for the wheel;
 the WIM System further comprising:
 a WIM sensor connected to the evaluation element that is configured to use the calibration function to subtract the deviation from a measured wheel force of the WIM sensor according to a wheel force range of the measured wheel force that is within and according to a speed range of a speed determined for the wheel is within; and
 wherein the evaluation element is configured to provide the result as a calibrated wheel force.

2. WIM system according to claim 1, wherein in step a) the road profile is recorded by the recording vehicle with an accuracy of at least 1 mm, along a vertical axis of the roadway; wherein in step a) the road profile is recorded by the recording vehicle with an accuracy of at least 100 mm, along a longitudinal axis of the roadway; wherein in step a) the road profile is recorded by the recording vehicle with an accuracy of at least 100 mm, along a lateral axis of the roadway.

3. WIM system according to claim 1, wherein the wheel in step b) is pressed onto the road profile by the body mass according to the simulation.

4. WIM system according to claim 3, wherein in step b) the wheel is connected to the body mass via a resilient connection that includes a first spring element with a predefined spring constant and that includes a first damper element with a damping constant.

5. WIM system according to claim 4, wherein in step b) the wheel according to the simulation features a wheel mass, a second spring element and a second damper element; wherein the wheel in step b) is pressed onto the surface of the roadway by the wheel mass according to the simulation; and wherein the wheel with the second spring element and second damper element is a damped mass-spring system.

6. WIM system according to claim 1, wherein the body mass is connected to a contact point between the wheel and the roadway via the damper element and the spring element; and wherein the simulation determines the wheel force that a wheel exerts onto the contact point between the wheel and the roadway.

7. WIM system according to claim 6, wherein in step b) the simulation determines an excitation of the damped mass-spring system excited by the wheel moving with a speed across an unevenness of the surface of the roadway, wherein the unevenness being represented within the road profile of step a).

8. WIM system according to claim 7, wherein for a position in step c) the wheel force according to the simulation is depending on the spring element and the damper element of the damped mass-spring system; wherein for a position in step c) the wheel force according to the simulation is depending on the speed of the wheel moving across the surface of the roadway; and wherein for a position in step c) the wheel force according to the simulation is depending on the mass element of the mass spring system.

9. WIM system according to claim 8, wherein step c) is performed by the simulation for a number of adjacent positions on the longitudinal axis and/or adjacent positions on a lateral axis that is disposed perpendicularly to the longitudinal axis and in the same plane as the longitudinal axis; wherein a distance between adjacent positions is between 2 mm and 500 mm; wherein step c) is performed by the simulation for at least one speed of the wheel on the road profile; wherein the simulation uses the speed in combination with the road profile of the roadway in determining the excitation of the damped mass-spring system.

10. WIM System according to claim 1, wherein the wheel force measured by the WIM sensor is calibrated with the calibration function; wherein the calibrated wheel force reduces the influence of the road profile on the measured wheel force by at least 75% with respect to the measured wheel force of a stationary vehicle.

11. A method of installing a WIM System in a roadway extending along a longitudinal direction and having a surface defined by a road profile, which is a three dimensional representation of the surface of the roadway, the method comprising:
  a2) for a section of the roadway measuring at least 25 m in length in the longitudinal direction, using a recording vehicle to record the road profile of the section of the roadway;
  b2) using a simulation to determine a wheel force exerted on the road profile by a wheel pressed onto the surface of the roadway according to the simulation, wherein the wheel is moving with a speed across the road profile of step a2) in the longitudinal direction according to the simulation, which includes a system of differential equations solved for movement of the wheel's mass and a body mass of a damped mass-spring system having a spring element and a damper element together with the wheel mass and the body mass;
  c2) wherein the simulation is used to determine a dependence of the wheel force exerted on the road profile determined in step a2) for a number of adjacent positions in the section, wherein adjacent positions are spaced apart from each other in the longitudinal direction between 250 mm and 5000 mm;
  d2) wherein step c2) is performed for different speed ranges within an overall speed range between and including 5 km/h and 250 km/h; wherein step c2) is performed for different wheel force ranges within an overall wheel force range between and including 1000 N and 50000 N per wheel; and wherein the spring element and the damper element are predetermined as a function of a respective wheel force range;
  e2) selecting a position of the section of the roadway according to the results of step d2), where the dependence of wheel force is minimal for at least one preselected wheel force range and at least one preselected speed range;
  preparing an opening in the roadway at the selected position of the section of the roadway to receive the WIM sensor; and
  installing the WIM sensor in the opening.

* * * * *